US011821200B2

(12) United States Patent
Fiorilla et al.

(10) Patent No.: US 11,821,200 B2
(45) Date of Patent: Nov. 21, 2023

(54) INTERFACE TRANSITION AND ENVIRONMENTAL BARRIER

(71) Applicant: Schul International Co., LLC, Hudson, NH (US)

(72) Inventors: Nicholas A Fiorilla, Hudson, NH (US); Michael M. Sebold, Cleveland Heights, OH (US); Brian J. Iske, Nashua, NH (US); Chad Heikkila, New Brighton, MN (US); Donald Wallis, Plaistow, NH (US); Stephen M. Pierson, Lakewood, OH (US); Adam Milter, Bay Village, OH (US); Phillip David Effler, Macedonia, OH (US); Cory Bendokas, Lakewood, OH (US)

(73) Assignee: Schul International Co., LLC, Hudson, NH (US)

( * ) Notice: Subject to any disclaimer, the term of this patent is extended or adjusted under 35 U.S.C. 154(b) by 0 days.

(21) Appl. No.: 17/682,415

(22) Filed: Feb. 28, 2022

(65) Prior Publication Data

US 2023/0272614 A1    Aug. 31, 2023

(51) Int. Cl.
*B32B 7/12* (2006.01)
*E04B 1/68* (2006.01)
(Continued)

(52) U.S. Cl.
CPC .............. *E04B 1/6812* (2013.01); *B32B 3/06* (2013.01); *B32B 5/18* (2013.01); *B32B 5/32* (2013.01); *B32B 7/12* (2013.01); *B32B 2255/102* (2013.01); *B32B 2266/0278* (2013.01); *B32B 2266/06* (2013.01); *B32B 2307/51* (2013.01); *B32B 2307/54* (2013.01);
(Continued)

(58) Field of Classification Search
CPC .............................. E04B 1/6812; E04B 1/6818
See application file for complete search history.

(56) References Cited

U.S. PATENT DOCUMENTS 6,685,196 B1 * 2/2004 Baerveldt ............. E01C 11/106
277/654
9,206,596 B1    12/2015 Robinson
(Continued)

OTHER PUBLICATIONS

Taina Matos, International Search Report—PCT/US2023/011941, dated May 2, 2023, 2 pages, United States Patent and Trademark Office as International Search Authority, Alexandria, Virginia, USA.
(Continued)

*Primary Examiner* — William P Watkins, III
(74) *Attorney, Agent, or Firm* — CRAIN, CATON & JAMES, P.C.; James E. Hudson, III

(57) ABSTRACT

An interface transition for use in compression in connection with panels where air and/or water penetration is undesirable having a first body, a second body, an adhesive layer positioned intermediate the first body and the second body, and an impregnation into at least the first body, wherein the combination of the bodies, adhesive layer and impregnation reduces the air leakage rate therethrough and moisture infiltration therein after the interface transition is compressed to a width 75% of its uncompressed width. The interface transition may include an extension member for splicing and construction of a four-way intersection.

21 Claims, 7 Drawing Sheets

(51) Int. Cl.
  *B32B 3/06* (2006.01)
  *B32B 5/18* (2006.01)
  *B32B 5/32* (2006.01)
(52) U.S. Cl.
  CPC ............... *B32B 2307/7242* (2013.01); *B32B 2307/7265* (2013.01); *B32B 2607/00* (2013.01); *Y10T 428/28* (2015.01)

(56) References Cited

U.S. PATENT DOCUMENTS

| | | | |
|---|---|---|---|
| 9,404,581 | B1 | 8/2016 | Robinson |
| 9,803,357 | B1 | 10/2017 | Robinson |
| 9,915,038 | B2 | 3/2018 | Robinson |
| 9,982,429 | B2 | 5/2018 | Robinson |
| 9,995,036 | B1 | 6/2018 | Robinson |
| 10,000,921 | B1 | 6/2018 | Robinson |
| 10,060,122 | B2 | 8/2018 | Robinson |
| 10,066,386 | B2 | 9/2018 | Robinson |
| 10,081,939 | B1 | 9/2018 | Robinson |
| 10,087,619 | B1 | 10/2018 | Robinson |
| 10,087,620 | B1 | 10/2018 | Robinson |
| 10,087,621 | B1 | 10/2018 | Robinson |
| 10,125,490 | B2 | 11/2018 | Robinson |
| 10,203,035 | B1 | 2/2019 | Robinson |
| 10,213,962 | B2 | 2/2019 | Robinson |
| 10,233,633 | B2 | 3/2019 | Robinson |
| 10,240,302 | B2 | 3/2019 | Robinson |
| 10,280,610 | B1 | 5/2019 | Robinson |
| 10,280,611 | B1 | 5/2019 | Robinson |
| 10,323,360 | B2 | 6/2019 | Robinson |
| 10,323,407 | B1 | 6/2019 | Robinson |
| 10,323,408 | B1 | 6/2019 | Robinson |
| 10,323,409 | B1 | 6/2019 | Robinson |
| 10,352,003 | B2 | 7/2019 | Robinson |
| 10,352,039 | B2 | 7/2019 | Robinson |
| 10,358,777 | B2 | 7/2019 | Robinson |
| 10,358,813 | B2 | 7/2019 | Robinson |
| 10,480,136 | B2 | 11/2019 | Robinson |
| 10,480,654 | B2 | 11/2019 | Robinson |
| 10,533,315 | B2 | 1/2020 | Robinson |
| 10,533,316 | B1 | 1/2020 | Robinson |
| 10,544,548 | B2 | 1/2020 | Robinson |
| 10,557,263 | B1 | 2/2020 | Robinson |
| 10,584,481 | B2 | 3/2020 | Robinson |
| 10,787,807 | B1 | 9/2020 | Robinson |
| 10,787,808 | B2 | 9/2020 | Robinson |
| 10,794,055 | B1 | 10/2020 | Robinson |
| 10,808,398 | B1 | 10/2020 | Robinson |
| 10,844,959 | B2 | 11/2020 | Robinson et al. |
| 10,851,541 | B2 | 12/2020 | Robinson |
| 10,851,897 | B2 | 12/2020 | Robinson |
| 10,941,563 | B2 | 3/2021 | Robinson |
| 10,982,428 | B2 | 4/2021 | Robinson |
| 10,982,429 | B2 | 4/2021 | Robinson |
| 11,015,336 | B2 | 5/2021 | Robinson |
| 11,028,577 | B2 | 6/2021 | Robinson |
| 11,035,116 | B2 | 6/2021 | Robinson |
| 11,210,408 | B2 | 12/2021 | Robinson |
| 2002/0144480 | A1 | 10/2002 | Sagnard et al. |
| 2005/0215727 | A1* | 9/2005 | Feldstein ............... A61K 8/86 |
| | | | 525/326.9 |
| 2007/0151185 | A1 | 7/2007 | Robinson |
| 2015/0315779 | A1 | 11/2015 | Baily et al. |
| 2019/0107201 | A1 | 4/2019 | Robinson et al. |
| 2021/0162713 | A1 | 6/2021 | Couturier et al. |

OTHER PUBLICATIONS

Taina Matos, Written Opinion of the International Search Authority—PCT/US2023/011941, dated May 2, 2023, 20 pages, United States Patent and Trademark Office as International Search Authority, Alexandria, Virginia, USA.

\* cited by examiner

INTERFACE TRANSITION AND ENVIRONMENTAL BARRIER

CROSS-REFERENCE TO RELATED APPLICATIONS

None.

STATEMENT REGARDING FEDERALLY SPONSORED RESEARCH OR DEVELOPMENT

Not Applicable.

BACKGROUND

Field

The present disclosure relates generally to systems for creating a resilient and flexible seal between adjacent panels, including those which may be subject to temperature expansion and contraction or mechanical shear. More particularly, the present disclosure is directed to a compressed interface transition for use in connection with panels where air and/or water penetration is undesirable.

Description of the Related Art

Construction panels come in many different sizes and shapes and may be used for various purposes, including roadways, sideways, and pre-cast structures, particularly buildings. Whether formed in place or by use of precast panels, designs generally require forming a lateral gap or joint between adjacent panels to allow for independent movement, such in response to ambient temperature variations within standard operating ranges, building settling or shrinkage and seismic activity. Moreover, these joints are subject to damage over time. Seals between these panels may be intended to preclude foreign bodies from becoming lodged between the panels, to impede water accumulation between the panels, to prevent exposure by subsurface components to chemicals, to prevent air penetration or escape, and to reduce temperature variations at joints.

Various seal systems and configurations have been developed for imposition between these panels to provide seals to provide one or more of fire protection, waterproofing, sound and air insulation. This typically is accomplished with a seal created by imposition of multiple constituents in the joint, such as air and vapor barriers, silicone application, backer bars, and elastically-compressible cores, such as of foam, where the core contains or supported fire retardant materials. The use and assembly of multiple constituents can slow installation and provide multiple potential points of failure, particularly as the seal must function across multiple and cycling stages of compression and expansion in response to environmental conditions.

SUMMARY

The present disclosure therefore meets the above needs and overcomes one or more deficiencies in the prior art by providing an interface transition including a first body, a second body, an adhesive layer, and an impregnation. The first body is laterally elastically resiliently compressible and impregnatable, has a first body top surface extending from a first body top surface first side edge to a first body top surface second exterior side edge and from a first body top surface first end edge to a first body top surface second end edge, has a first body uncompressed width from the first body top surface first side edge to the first body top surface second exterior side edge, has a first body bottom surface opposite the first body top surface extending from a first body bottom surface first edge to a first body second exterior side bottom edge, has a first body height from the first body top surface second exterior side edge to the first body second exterior side bottom edge, has a first body first exterior side extending from first body top surface first side edge to the first body bottom surface first edge, and has a first body second exterior side extending from the first body top surface second exterior side edge to the first body second exterior side bottom edge laterally opposite the first body first exterior side. The second body is laterally elastically resiliently compressible, has a second body bottom surface extending from a second body bottom surface first edge to a second body bottom surface second edge and from a second body bottom surface second end edge to a second body bottom surface first end edge, and has a second body uncompressed width from the second body bottom surface first edge to the second body bottom surface second edge. The second body bottom surface first edge is laterally opposite the second body bottom surface second edge. The first body uncompressed width and the second body uncompressed width are equal. The second body further has a second body height from a second body top surface second edge to the second body bottom surface first edge, has a second body first exterior side extending from the second body top surface second edge to the second body bottom surface first edge, and has a second body second exterior side extending from a second body second exterior side top edge to the second body bottom surface second edge. The sum of first body height and second body height is not more than one hundred twenty-five percent of the first body uncompressed width and not less than twenty percent of the first body uncompressed width. The adhesive layer is adhered to the first body top surface from the first body top surface first side edge to the first body top surface second exterior side edge and from the first body top surface first end edge to the first body top surface second end edge, is adhered to the second body bottom surface from the second body bottom surface first edge to second body bottom surface second edge and from the second body bottom surface second end edge to the second body bottom surface first end edge, and the adhesive layer impedes air permeability between the first body and the second body. The first body first exterior side is aligned with the second body first exterior side and the first body second exterior side is aligned with the second body second exterior side. The impregnation is impregnated through the first body at one of the first body top surface and the first body bottom surface, the impregnation impeding air permeability through the first body. The impregnation and the adhesive layer reduce the air leakage rate to no more than 0.04 cfm/ft$^2$ at ±1.57 psf (0.2 L/(s·m$^2$) at ±75 Pa) measured according to ASTM E283-19 through the interface transition where the first body is laterally compressed to a first body compressed width 75% of the first body uncompressed width and the second body is laterally compressed to a second body compressed width equal to the first body compressed width. Moreover, the impregnation and the adhesive layer prevent a moisture infiltration for 2 hours at 6.24 psf (−300 Pa) according to ASTM E331-16 into the interface transition where the first body is laterally compressed to the first body compressed width and the second body is laterally compressed to the second body compressed width.

Further, the interface transition may further include an extension member. The interface transition may include the first body having a first body length from the first body top surface first end edge to the first body top surface second end edge, the first body having a first body first end extending from the first body top surface first end edge to the first body bottom surface, the second body having a second body length from the second body bottom surface first end edge to the second body bottom surface second end edge. The second body bottom surface first edge is laterally opposite the second body bottom surface second edge. The interface transition may include the second body having a second body first end extending from the second body bottom surface first end edge to the second body top surface. The first body first end may be aligned with the second body first end. The second body length may be equal to the first body length. The adhesive layer may have an adhesive layer height. The extension member may have a first body extension, a second body extension and an adhesive layer extension, where the first body extension extends from the first body first end a first body extension length to a first body extension first end and the first body extension has a first body extension height and a first body extension top surface coplanar with the first body top surface. The second body extension extends from the second body first end the first body extension length to a second body extension first end and has a second body extension height and a second body extension bottom surface coplanar with the second body bottom surface. The adhesive layer extension extends from the adhesive layer the first body extension length to the first body extension first end and adhered to the first body extension and the second body extension, the first adhesive layer extension having an adhesive layer extension height equal to the adhesive layer height, has an extension member outer surface extending from one of the first body bottom surface and the second body top surface, and has an extension member height not more than sixty-five percent (65%) of the sum of the first body extension height and the adhesive layer extension height and the second body extension height.

An interface transition system may include four interface transitions, where each transition is provided and includes an extension member, where the first interface transition of the four interface transitions is perpendicular to the second interface transition of the four interface transitions and wherein the extension member of the first interface transition of the four interface transitions contacts the extension member of the second interface transition of the four interface transitions, and the first interface transition of the four interface transitions is parallel to the third interface transition of the four interface transitions and wherein the extension member of the first interface transition of the four interface transitions contacts the first extension member of the third interface transition of the four interface transitions, and the second interface transition of the four interface transitions is parallel to the fourth interface transition of the four interface transitions and wherein the extension member of the second interface transition of the four interface transitions contacts the extension member of the fourth interface transition of the four interface transitions.

Likewise, an interface transition may include a first body, a second body, an adhesive layer, an impregnation and a second impregnation. The first body may be laterally elastically resiliently compressible and impregnatable, have a first body top surface extending from a first body top surface first side edge to a first body top surface second exterior side edge and from a first body top surface first end edge to a first body top surface second end edge, have a first body uncompressed width from the first body top surface first side edge to the first body top surface second side edge, have a first body bottom surface opposite the first body top surface extending from a first body bottom surface first edge to a first body second exterior side bottom edge, have a first body height from the first body top surface second exterior side edge to the first body second exterior side bottom edge have a first body first exterior side extending from first body top surface first side edge to the first body bottom surface first edge, and have a first body second exterior side extending from the first body top surface second exterior side edge to the first body second exterior side bottom edge laterally opposite the first body first exterior side. The second body may be laterally elastically resiliently compressible and impregnatable, have a second body bottom surface extending from a second body bottom surface first edge to a second body bottom surface second edge and from a second body bottom surface second end edge to a second body bottom surface first end edge, and have a second body uncompressed width from the second body bottom surface first edge to the second body bottom surface second edge. The second body bottom surface first edge is laterally opposite the second body bottom surface second edge. The first body uncompressed width and the second body uncompressed width may be equal. The second body may have a second body height from a second body top surface second edge to the second body bottom surface first edge, have a second body first exterior side extending from the second body top surface second edge to the second body bottom surface first edge, have a second body second exterior side extending from a second body second exterior side top edge to the second body bottom surface second edge. The sum of first body height and second body height is not more than one hundred twenty-five percent of the first body uncompressed width and not less than twenty percent of the first body uncompressed width. The adhesive layer is adhered to the first body top surface from the first body top surface first side edge to the first body top surface second exterior side edge and from the first body top surface first end edge to the first body top surface second end edge, and is adhered to the second body bottom surface from the second body bottom surface first edge to second body bottom surface second edge and from the second body bottom surface second end edge to the second body bottom surface first end edge. The adhesive layer impedes air permeability between the first body and the second body. The first body first exterior side is aligned with the second body first exterior side and the first body second exterior side is aligned with the second body second exterior side. The impregnation is impregnated through the first body at one of the first body top surface and the first body bottom surface and the impregnation impedes air permeability through the first body and the second impregnation is impregnated through the second body at one of the second body top surface and the second body bottom surface and the second impregnation impedes air permeability through the second body. The impregnation, the second impregnation, and the adhesive layer reduce the air leakage rate to no more than 0.04 cfm/ft$^2$ at ±1.57 psf (0.2 L/(s·m$^2$) at ±75 Pa) measured according to ASTM E283-19 through the interface transition where the first body is laterally compressed to a first body compressed width 75% of the first body uncompressed width and the second body is laterally compressed to a second body compressed width equal to the first body compressed width. The impregnation, the second impregnation, and the adhesive layer prevent a moisture infiltration for 2 hours at 6.24 psf (–300 Pa) according to ASTM E331-16 into the interface transition where the first body is laterally compressed to the first body compressed width and the second body is laterally compressed to the second body compressed width.

The interface transition may include a first body, a second body, an adhesive layer, and an impregnation. The first body may be laterally elastically resiliently compressible and having a first body height and a first body uncompressed width, formed of a porous and impregnatable first foam, have a first body uncompressed width from the first body top surface first side edge to the first body top surface second side edge, have a first body bottom surface opposite the first body top surface extending from a first body bottom surface first edge to a first body second exterior side bottom edge, have a first body height from the first body top surface second exterior side edge to the first body second exterior side bottom edge, have a first body first exterior side extending from first body top surface first side edge to the first body bottom surface first edge, have a first body second exterior side extending from the first body top surface second exterior side edge to the first body second exterior side bottom edge laterally opposite the first body first exterior side. The second body may be laterally elastically resiliently compressible and having a second body height and formed of a porous and impregnatable second foam. The sum of the first body height and the second body height is not more than one hundred twenty-five percent of the first body uncompressed width and not less than twenty percent of the first body uncompressed width. The adhesive layer may be adhered to the first body and the second body and impedes air permeability between the first body and the second body. The impregnation is impregnated through the first body and impedes air permeability through the first body may be impregnated through the second body to impede air permeability through the second body. The impregnation and the adhesive layer reduce the air leakage rate to no more than 0.04 cfm/ft$^2$ at ±1.57 psf (0.2 L/(s·m$^2$) at ±75 Pa) measured according to ASTM E283-19 through the interface transition where the first body is laterally compressed to a first body compressed width 75% of the first body uncompressed width and the second body is laterally compressed to a second body compressed width equal to the first body compressed width. The impregnation and the adhesive layer prevent a moisture infiltration for 2 hours at 6.24 psf (−300 Pa) according to ASTM E331-16 into the interface transition where the first body is laterally compressed to the first body compressed width and the second body is laterally compressed to the second body compressed width.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

Figure 8:
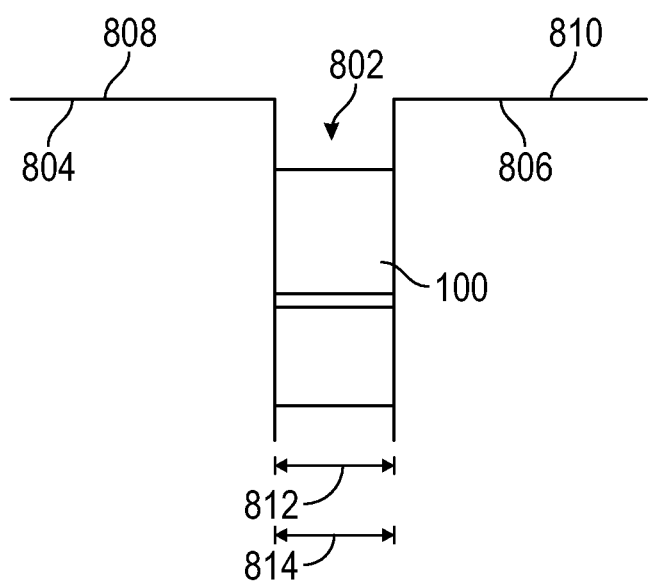
FIG. 8 provides an end view of one embodiment of the present disclosure imposed between substrates.

An interface transition 100 is provided for imposition in a joint to function as a joint seal between expansion joints and may be positioned between construction panels, each of which may be referred to have two substrates. Referring to FIG. 8, an end view of one embodiment of the present disclosure imposed between substrates is provided. The joint or interface 802 is formed of a first substrate or panel 804 and a second substrate or panel 806, which are each substantially aligned to provide a common surface, such that the first substrate top surface 808 is aligned with the second substrate top surface 810. The joint or interface 802 is formed as the first substrate or panel 804 is separated, or distant, the second substrate or panel 806 by a joint first distance 812, which will likewise define the first body compressed width 814, particularly at its median or intended position prior to expansion or compression of the first substrate 804 and/or the second substrate 806 into the joint or interface 802, such as, for example, a 2 in. joint with a movement of 1 inch, providing a joint first distance 812 of 1 in. at minimum joint size, a joint first distance 812 of 3 in. at maximum joint size, and a joint first distance 812 of 2 in. at median The interface transition 100 includes a first body 102, a second body 124, an adhesive layer 122, and an impregnation 164. Notably, only when laterally compressed by at least 25% does the interface transition 100 provide the desired reduced air leakage rate and duration of bar to moisture prevention. The combined height of the first body 102 and the second body 124 is less than 125% of the uncompressed width of the first body 102. The resulting relationship may be used to provide an interface transition 100 which provides a generally rectangular profile in end-view and which may approach a square profile.

The first body 102 is composed of a laterally elastically resiliently compressible and impregnatable material, which may be an open-celled foam, such as a polyurethane foam. The material of the first body 102 is selected to be elastic so that it may be compressed and partially expand during movement one of the first substrate or panel 804 and a second substrate or panel 806, such as due to temperature variations. The material of the first body 102 is selected to be resiliently compressible as the first body 102 will repeatedly be under increased or decreased compression during use. Because the first body 102 is imposed between the first substrate or panel 804 and a second substrate or panel 806, it is continuously under compression, though the amount of compression will vary. As the first substrate or panel 804 and a second substrate or panel 806 move, and as the sides of the first body 102 contact the first substrate or panel 804 and a second substrate or panel 806, the first body 102 is laterally compressed. The first body 102 is selected from a material which will permit its impregnation and subsequent containment of the impregnate 164.

Impregnation provides a widely disbursement of impregnate throughout the body. Impregnation is typically accomplished by compressing the elastically-compressible core 128, introducing a compressed elastically-compressible core 128 to an impregnate in a liquid medium, and permitting expansion in the presence of the fire-retardant material, resulting in suction within the elastically-compressible core 128 as the internal voids re-expand and fill, and then permitting the medium, such as a binder, to evaporate or weep out. When desired, the impregnate body can be partially compressed to limit the volume of impregnate impregnated. Other methods of introducing the impregnation resulting from pressure differential may likewise be contemplated.

Because impregnation provides the introduction of impregnate across the entirety of the exposed body, the disbursal is quite wide, as opposed to infusion or injection which necessarily require the liquid medium to be introduced as specified locations and to disburse therefrom.

Figure 1:
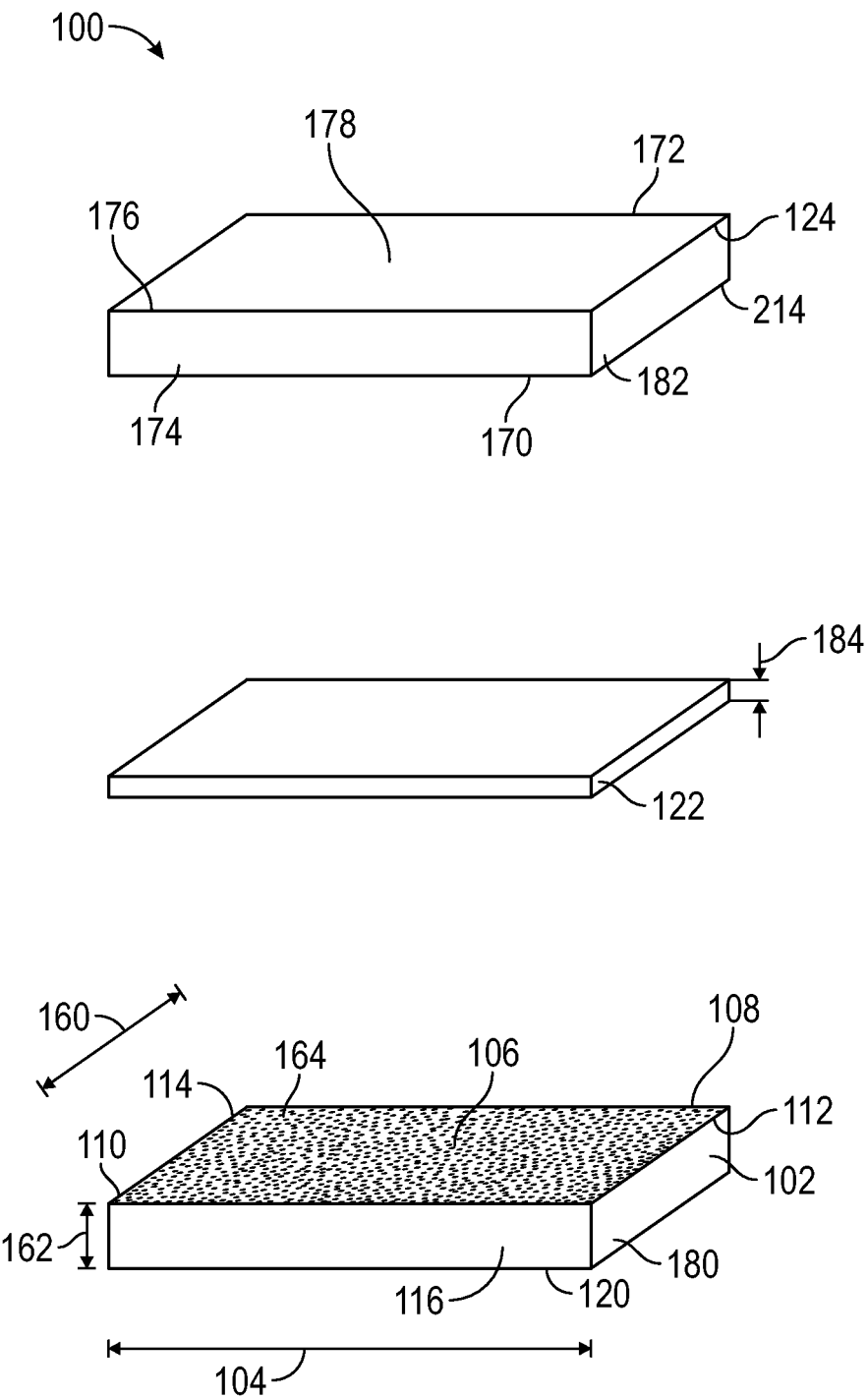
FIG. 1 provides an exploded view of one embodiment of the present disclosure.
Figure 2:
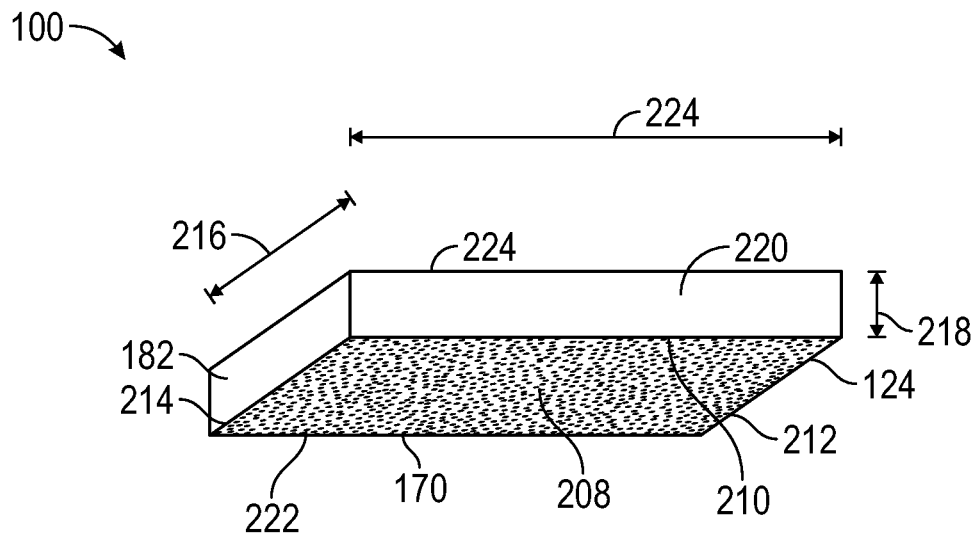
FIG. 2 provides an exploded view of the embodiment illustrated in FIG. 1 from an opposing side.
Figure 2:
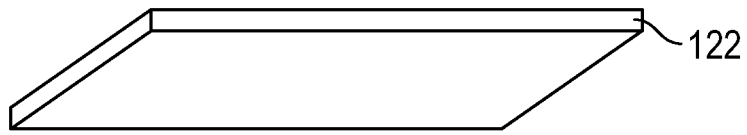
Figure 2:
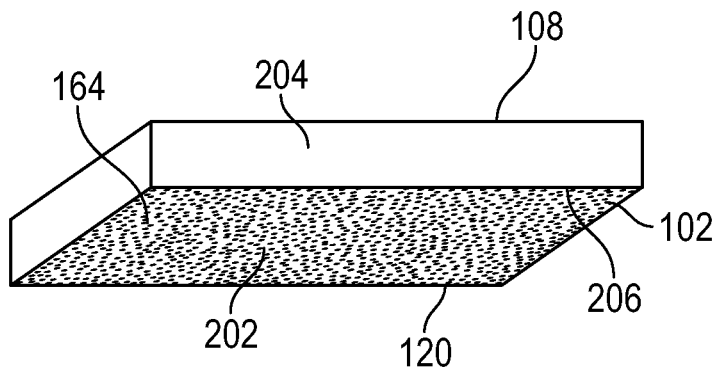

Referring to FIG. 1, an exploded view of one embodiment of the present disclosure is provided. Referring to FIG. 2, an exploded view of the embodiment illustrated in FIG. 1 from an opposing side is provided. The first body 102 may be provided as a rectangular prism, but other shapes may alternatively be used, such that the end of the first body 102 is a trapezoid shape or a conic section, preferably where the widest part of the first body 102 is adjacent the balance of the components of the interface transition 100.

Regardless of the shape of the first body 102, it will have a first body surface 106, a first body uncompressed width 160, a first body bottom surface 202, a first body height 162, first body first exterior side 204, and a first body second exterior side 116. The first body top surface 106 extends from a first body top surface first side edge 108 to a first body top surface second exterior side edge 110 and from a first body top surface first end edge 112 to a first body top surface second end edge 114. The first body uncompressed width 160 is measured from the first body top surface first side edge 108 to the first body top surface second exterior side edge 110, defining a lateral measurement and identifying the extent of subsequent lateral compression. The first body bottom surface 202 is opposite the first body top surface 106 and extends from a first body bottom surface first edge 206 to a first body second exterior side bottom edge 120. The first body height 162 is measured from the first body top surface second exterior side edge 110 to the first body second exterior side bottom edge 120. The first body first exterior side 204 extends from first body top surface first side edge 108 to the first body bottom surface first edge 206. The first body second exterior side 116 extends from the first body top surface second exterior side edge 110 to the first body second exterior side bottom edge 120 laterally opposite the first body first exterior side 204. Thus, laterally refers to between the sides along the plane for measurement of width. The first body bottom surface 202 may be flat or curved. Each of the first body second exterior side 116 and the first body first exterior side 204 is adapted to contact one of the first substrate or panel 804 and the second substrate or panel 806 and therefore may be provided to be parallel to the first substrate or panel 804 and the second substrate or panel 806. Each of the first body second exterior side 116 and the first body first exterior side 204 may be treated to adhere to one of the first substrate or panel 804 and the second substrate or panel 806, such as by an adhesive applied thereon or an additional surface selected to deter movement up or down relative to the first body second exterior side 116 and the first body first exterior side 204.

The second body 124 is composed of a laterally elastically resiliently and compressible material, which may be an open-celled foam, such as a polyurethane foam and may be the same material as used for the first body 102 or may be different. The material of the second body 124 is selected to be elastic so that it may be compressed and partially expand during movement one of the first substrate or panel 804 and a second substrate or panel 806, such as due to temperature variations. The material of the second body 124 is selected to be resiliently compressible as the first second body 124 will repeatedly be under increased or decreased compression during use. Because the second body 124 is imposed between the first substrate or panel 804 and a second substrate or panel 806, it is continuously under compression, though the amount of compression will vary. As the first substrate or panel 804 and a second substrate or panel 806 move, and as the sides of the second body 124 contact the first substrate or panel 804 and a second substrate or panel 806, the second body 124 is laterally compressed.

Regardless of the shape of the second body 124, the second body 124 will have a second body bottom surface 208, a second body uncompressed width 216, a second body height 218, a second body first exterior side 220, and a second body second exterior side 174. The second body bottom surface 208 extends from a second body bottom surface first edge 210 to a second body bottom surface second edge 170 and from a second body bottom surface second end edge 212 to a second body bottom surface first end edge 214 and is opposite a second body top surface 178 which may be flat or curved. The second body bottom surface first edge 210 is laterally opposite the second body bottom surface second edge 212. The second body uncompressed width 216 is measured from the second body bottom surface first edge 210 to the second body bottom surface second edge 170, defining a lateral measurement and identifying the extent of subsequent lateral compression. Preferably the first body uncompressed width 160 and the second body uncompressed width 216 are equal. The second body height 218 is measured from a second body top surface second edge 172 to the second body bottom surface first edge 210. The second body first exterior side 220 extends from the second body top surface second edge 172 to the second body bottom surface first edge 210. The second body second exterior side 174 extends from a second body second exterior side top edge 176 to the second body bottom surface second edge 170.

Each of the second body first exterior side 220 and the second body second exterior side 174 is adapted to contact one of the first substrate or panel 804 and the second substrate or panel 806 and therefore may be provided to be parallel to the first substrate or panel 804 and the second substrate or panel 806. Each of the second body first exterior side 220 and the second body second exterior side 174 may be treated to adhere to one of the first substrate or panel 804 and the second substrate or panel 806, such as by an adhesive applied thereon or an additional surface selected to deter movement up or down relative to the second body first exterior side 220 and the second body second exterior side 174. The second body 124 may be shaped to aid in installation, such as by providing a trapezoidal shape or conic share, wherein the second body 124 is wider at the second body bottom surface 208 than at the second body top surface 178.

The sum of first body height 162 and second body height 218 is not more than one hundred twenty-five percent of the first body uncompressed width and not less than twenty percent of the first body uncompressed width.

The adhesive layer 122 is positioned intermediate the first body 102 and the second body 124 and impedes air permeability between the first body 102 and the second body 124. The adhesive layer 122 is adhered to the first body top surface 106 from the first body top surface first side edge 108 to the first body top surface second exterior side edge 110 and from the first body top surface first end edge 112 to the first body top surface second end edge 114. The adhesive layer 122 is adhered to the second body bottom surface 208 from the second body bottom surface first edge 210 to second body bottom surface second edge 170 and from the second body bottom surface second end edge 212 to the second body bottom surface first end edge 214. The adhesive layer 122 may be applied as a liquid, may be a gunnable solid or may be a solid layer, such as a membrane. The adhesive layer 122 may be sized to fully coat the first body top surface 106 or may be applied sufficiently across the surface of the first body top surface 106 to provide a bond but still not coat the entirety of the first body top surface 106. The adhesive layer 122, however, must be capable of impeding airflow. The adhesive layer 122 may be selected to provide further properties, such as containing hydrophilic, hydrophobic, and/or fire-retardant compositions.

The first body 102, second body 124 and adhesive layer 122 are aligned. The first body first exterior side 204 is aligned with the second body first exterior side 220 and the first body second exterior side 116 is aligned with the second body second exterior side 174.

The impregnation 164 is impregnated through the first body 102 at one of the first body top surface 106 and the first body bottom surface 202 wherein the impregnation 164 impedes air permeability through the first body 102. The impregnation may be selected to contain hydrophilic, hydrophobic, and/or fire-retardant compositions.

As a result of the selection of the adhesive layer 122 and the impregnation 164, the interface transition 100 obtains desirable air leakage properties when compressed to the extent necessary for operation between the first substrate or panel 804 and the second substrate or panel 806. Specifically, the compression and the addition of the impregnation 164 and the adhesive layer 122, in combination with the first body 102 and the second body 124, achieve a reduced air leakage rate of no more than 0.04 cfm/ft$^2$ at ±1.57 psf (0.2 L/(s·m$^2$) at ±75 Pa) measured according to ASTM E283-19 through the interface transition 100 where the first body 102 is laterally compressed to a first body compressed width 814 which is 75% of the first body uncompressed width 160 and the second body 124 is laterally compressed to a second body compressed width equal to the first body compressed width 814. Absent the adhesive layer 122 and the impregnation 164, the air leakage rate through the adjacent stacked first body 102 and the second body 124 is greater than 0.04 cfm/ft$^2$ at ±1.57 psf (0.2 L/(s·m$^2$) at ±75 Pa) measured according to ASTM E283-19 where the first body 102 is laterally compressed to a first body compressed width 814 which is 75% of the first body uncompressed width 160 and the second body 124 is laterally compressed to a second body compressed width equal to the first body compressed width 814. The adhesive layer 122 and the impregnation 164 reduce the air leakage rate from above the provided metric to at or below the provided metric. Preferably, the interface transition 100 is adapted for movement of about 50%, which provides that the compression will vary to a compressed width of between 25% of the first body uncompressed width 160 at maximum compression and 75% of the first body uncompressed width 160 at minimum compression. However, greater or lower desired plus-or-minus movement may be elected.

Likewise, a result of the selection of the adhesive layer 122 and the impregnation 164, the interface transition 100 obtains moisture infiltration properties when compressed to the extent necessary for operation between the first substrate or panel 804 and the second substrate or panel 806. Specifically, the compression and the addition of the impregnation 164 and the adhesive layer 122 in conjunction with the first body 102 and the second body 124 prevent a moisture infiltration for 2 hours at 6.24 psf (−300 Pa) according to ASTM E331-16 into the interface transition 100 where the first body 102 is laterally compressed to the first body compressed width 814 and the second body 124 is laterally compressed to the second body compressed width. The compression, the adhesive layer 122 and the impregnation 164 reduce the air leakage rate from above the provided metric to at or below the provided metric.

Notably, only when laterally compressed by at least 25% does the interface transition 100 provide the desired reduced air leakage rate and duration of bar to moisture prevention. The interface transition 100 is preferably sized to a 50% compression, i.e. that the first body uncompressed width 160 is twice the joint size. This may be alternatively characterized as a compression ratio of at least 2:1 to median. The interface transition 100 is intended to accommodate movement of the transition, which may narrow or open. The interface transition 100 may be further compressed as the distance between substrates is reduced, such as expansion of one or both substrates such as in response to heating. The interface transition 100 may be less compressed, but still in compression, as the distance between substrates is reduced, such as contraction of one or both substrates in response to cooling. As a result of such movement, the interface transition 100 provides the desirable air leakage properties and moisture prevention properties when the interface transition is laterally compressed to a first body compressed width 814 which is 75% of the first body uncompressed width 160. At that compression, the compression of the first body and the supported impregnation 164 reduces the porosity of the first body sufficient to meet the desired properties. Absent this compression, the reduced porosity resulting from the impregnation 164 at that compression, and the reduced porosity of the adhesive layer 122, the desired properties are not met.

To aid in interlocking the first body 102 and the second body 124, complementary shapes may be selected for the first body top surface 106 and the second body bottom surface 208. The first body top surface 106 may be flat and the second body bottom surface 208 may being flat. The second body bottom surface 208 may be parallel to the first body top surface 106. The second body bottom surface 208 may be concave and the first body top surface 106 may be convex. The second body bottom surface 208 may be convex and the first body top surface 106 may be concave. The second body bottom surface 208 may have a ridge and the first body top surface 106 may have a valley sized to the ridge.

When desired, the second body 124 may be impregnated as well. The second body 124 may be formed of a porous and impregnatable second foam, while the first body 102 may formed of a porous and impregnatable first foam. When so desired, the second body 124 may be selected from a material which is impregnatable and which will permit its impregnation and subsequent containment of a second impregnate 222 at one of the second body top surface 178 and the second body bottom surface 208 from the second body top surface 178 to the second body bottom surface 208. The second impregnate 222 may be the same as the impregnate 164 or may be different and/or provide different properties.

Each of the first body 102 and the second body 124 may be composed of a single piece of material or may be composed of a plurality of layers of one or more materials, such as foams.

The first body 102 and the second body 124 may be selected such that a second air leakage rate through them alone is greater than 0.04 cfm/ft$^2$ at ±1.57 psf (0.2 L/(s·m$^2$) at ±75 Pa) measured according to ASTM E283-19 through the first body 102 through the first body bottom surface 202 to the first body top surface 106 of the first body top surface 202 and through the second body bottom surface 208 to the second body top surface 178 of the second body 124 when the first body top surface 202 is directly adjacent the second body bottom surface 208 and the first body compressed width 814 which is 75% of the first body uncompressed width 160 and a second body compressed width is equal to the first body compressed.

Likewise, the first body 102 and the second body 124 may be selected such that a second air leakage rate through them alone is greater than 0.04 cfm/ft$^2$ at ±1.57 psf (0.2 L/(s·m$^2$) at ±75 Pa) measured according to ASTM E283-19 if the impregnation 164 and the adhesive layer 122 are absent from the interface transition 100 through the interface transition 100 where the first body compressed width 814 which is 75% of the first body uncompressed width 160 and the second body compressed width is equal to the first body compressed width 814.

Figure 3:
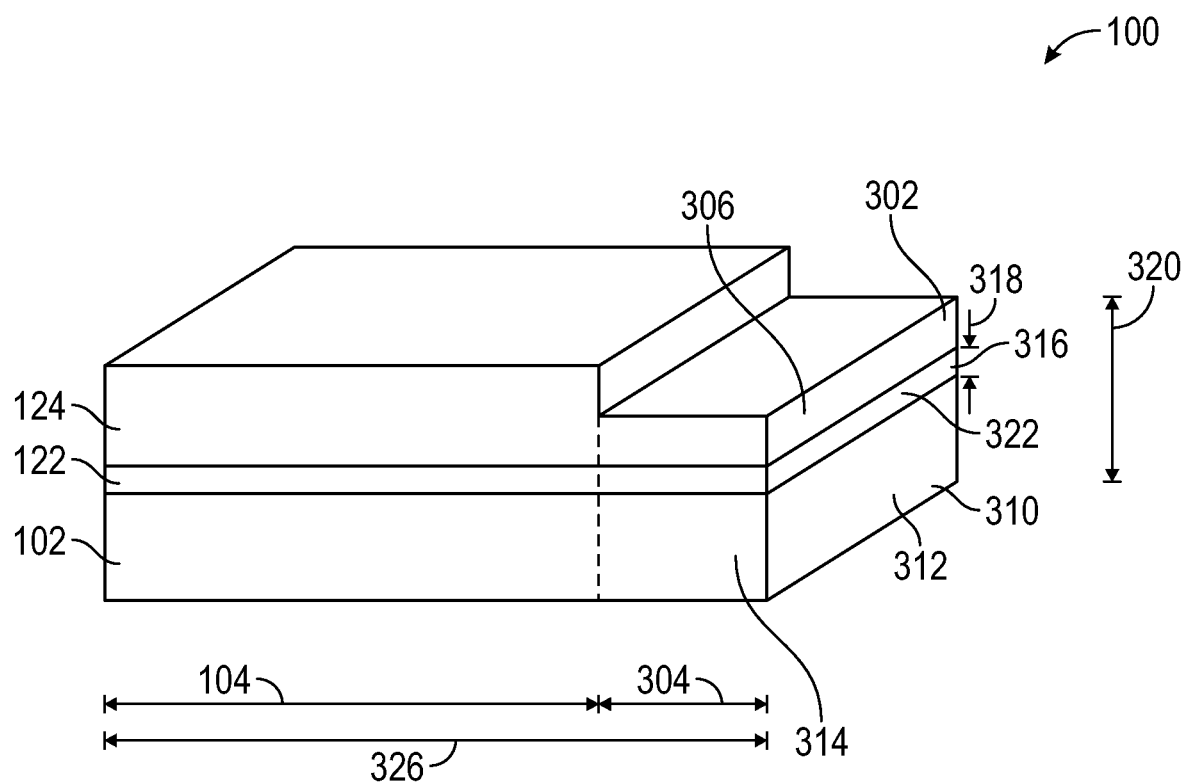
FIG. 3 provides an isometric view of an embodiment of the present disclosure having an extension.
Figure 4:
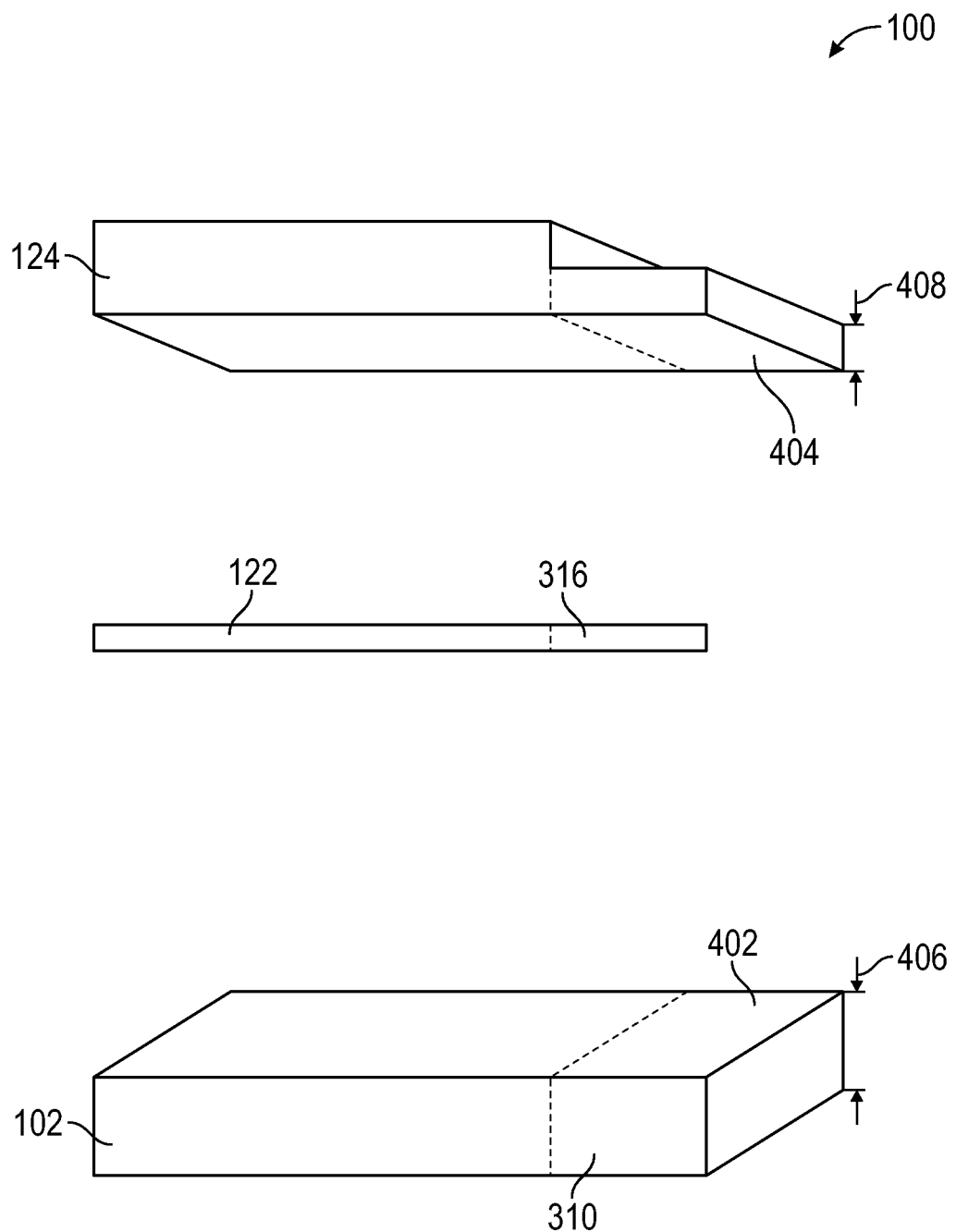
FIG. 4 provides an exploded view of the embodiment illustrated in FIG. 3.

To aid in joining sections of the interface transition 100, such as for a splice among two, three or four interface transitions 100, and providing a better seal, the interface transition 100 may have extension member 314, providing a step-down profile at an end, or a notched end, to aid in overlapping ends, thus precluding a single end plane which may separate from an abutting interface transition 100 and thus provide a point of failure. Referring to FIG. 3, an isometric view of an embodiment of the present disclosure having an extension is provided. Referring to FIG. 4, an exploded view of the embodiment illustrated in FIG. 3 is provided. The extension member 314 may be formed where the first body extension 310 is an integral extension of the first body 102, the second body extension 302 is an integral extension of the second body 124 and where the adhesive layer extension 316 is an integral extension of the adhesive layer 122. Alternatively, the extension member 314 may be formed where the first body extension 310 is adhered to the first body 102, the second body extension 302 is adhered to the second body 124 and the adhesive layer extension 316 is adhered to the adhesive layer 122. Because the extension member 314 is intended to provide a point of connection for a splice between two or more interface transitions 100, the extension member 314 may be selected from a shape to aid in connection.

When desired, the first body extension length 304 may be is equal to the first body compressed width 814 or may be at least twice the first body compressed width. Likewise, the extension member 314 may be a shape selected from the group of a rectangular prism, a triangular prism, or an internally-notched partial rectangular prism.

Figure 9:
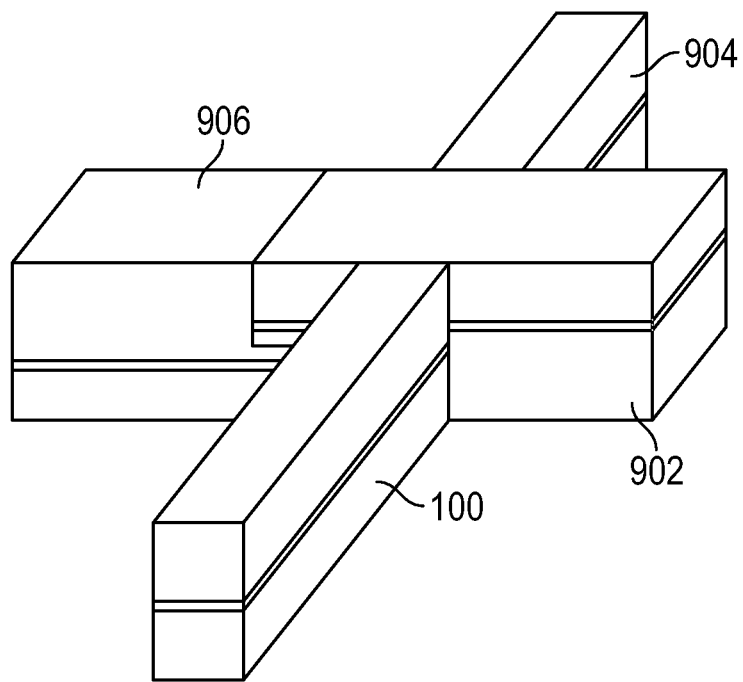
FIG. 9 provides a top view of a second arrangement of four of the embodiments illustrated in FIG. 3 when used in conjunction at a four-way intersection.

Referring to FIG. 9, the extension member 314 may be a rectangular prism providing conventional abutment positioning, such as when two or more interface transitions 100 are parallel or perpendicular, such as for a conventional running splice or right angle. The extension member 314 may be a triangular prism, providing surfaces so two interface transitions 100 may be positioned in opposition below a second pair of inverted interface transitions, such for a four-way intersection. Similarly, the extension member 314 may be a triangular prism for a pair of two interface transitions such as for a conventional running splice or right angle. Additionally, the extension member 314 may be an internally-notched partial rectangular prism, wherein the extension member 314 includes a notch which mates to a corresponding shape in a second extension member 314, providing a point of connection between two interface transitions 100 and thereby resisting longitudinal separation between the two interface transitions 100.

The first body 102 has a first body length 104 and a first body first end 180, the second body 124 has a second body length 224 and a second body first end 182, and the adhesive layer 122 has an adhesive layer height 184. The first body length 104 extends from the first body top surface first end edge 112 to the first body top surface second end edge 114. The first body first end 180 extends from the first body top surface first end edge 112 to the first body bottom surface 202. The second body length 224 extends from the second body bottom surface first end edge 214 to the second body bottom surface second end edge 212. The second body first end 182 extends from the second body bottom surface first end edge 214 to the second body top surface 178. The first body first end 180 is aligned with the second body first end 182 and the second body length 224 may be equal to the first body length 104. The extension member 314 includes a first body extension 310, a second body extension 302 and an adhesive layer extension 316. The first body extension 310 extends from the first body first end 180 a first body extension length 304 to a first body extension first end 312. The first body extension 310 has a first body extension height 406 and a first body extension top surface 402 coplanar with the first body top surface 106 so the two surfaces may be aligned and form a common body. The second body extension 302 extends from the second body first end 182 the first body extension length 304 to a second body extension first end 306, resulting in a maximum interface transition length 326 when combined with the first body length 104. The second body extension 302 has a second body extension height 408 and a second body extension bottom surface 404 coplanar with the second body bottom surface 208 so that the two surfaces are aligned and form a common body. The adhesive layer extension 316 extending from the adhesive layer 122 the first body extension length 304 to the first body extension first end 306 and adhered to the first body extension 310 and the second body extension 302. The first adhesive layer extension 316 having an adhesive layer extension height 318 equal to the adhesive layer height 184. The extension member 314 having an extension member outer surface 322 extending from one of the first body bottom surface 202 and the second body top surface 178. The extension member 314 has an extension member height 320 not more than sixty-five percent (65%) of the sum of the first body extension height 406 and the adhesive layer extension height 318 and the second body extension height 408. The limit on the extension member height 320 provides the step or notched end, wherein one end can overlap another with multiple, separate ends in abutment and a horizontal plane interrupting each end, to prevent downward penetration of air or water. The extension member 314 may be associated with either the first body 102 or the second body 124 and therefore the step down end or notch may be at the top or the bottom as elected. When desired, pairs of interface transitions 100 may be provided wherein the extension member 314 is associated with alternating first body 102 and second body 124 and the extension member is 50% of the sum of the first body extension height 406 and the adhesive layer extension height 318 and the second body extension height 408, so the pair of interface transitions 100 nest exactly against one another regardless of the first body height 162 or the second body height 218.

Figure 5:
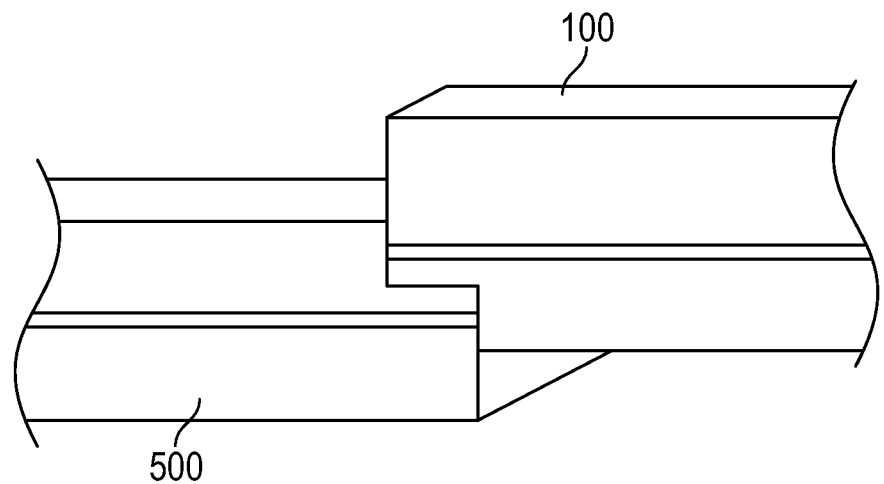
FIG. 5 provides an isometric view of two of the embodiments illustrated in FIG. 3 when used in conjunction along a common axis.

Referring to FIG. 5, an isometric view of two of the embodiments illustrated in FIG. 3 when used in conjunction along a common axis is provided. A first interface transition 100 and a second interface transition 500 may be positioned for a splice along a joint. In such an arrangement, the first body extension 302 of a first interface transition 100 is positioned against the first body extension 302 of a second interface transition 500 so the two interface transitions 100, 500 are overlapped at the extension member 314 of each and the first interface transition 100 is parallel and extending to the second interface transition 500. For the splice along a common axes, any first body extension length 304 may be selected, but the extension members 314 of each of the two interface transitions 100, 500 are preferably of equal first body extension length 304.

Figure 6:
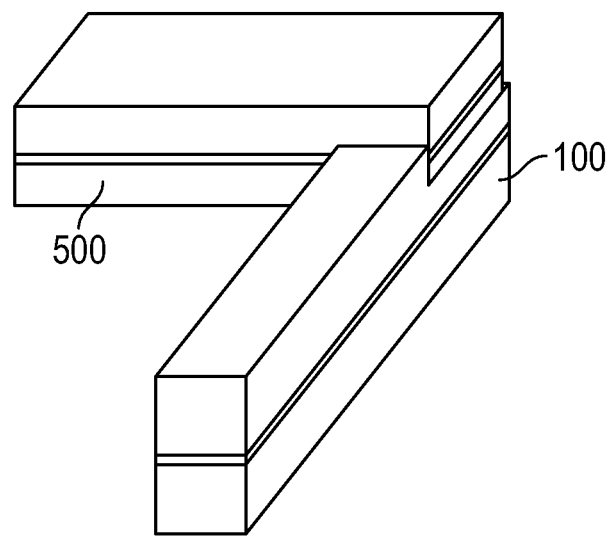
FIG. 6 provides an isometric view of two of the embodiments illustrated in FIG. 3 when used in conjunction along a right angle intersection.

Referring to FIG. 6, an isometric view of two of the embodiments illustrated in FIG. 3 when used in conjunction along a right angle intersection is provided. A first interface transition 100 and a second interface transition 600 may be positioned for a splice along a right-angle joint. In such an arrangement, the first body extension 302 of a first interface transition 100 is positioned against the first body extension 302 of a second interface transition 600 so the two interface transitions 100, 500 are overlapped at the extension member 314 of each but wherein the first interface transition 100 is right angle and extending to the second interface transition 600. For a right-angle splice, the first body extension length 304 is preferably equal to the first body compressed width 814 so that the two extension members 314 overlap.

Figure 7:
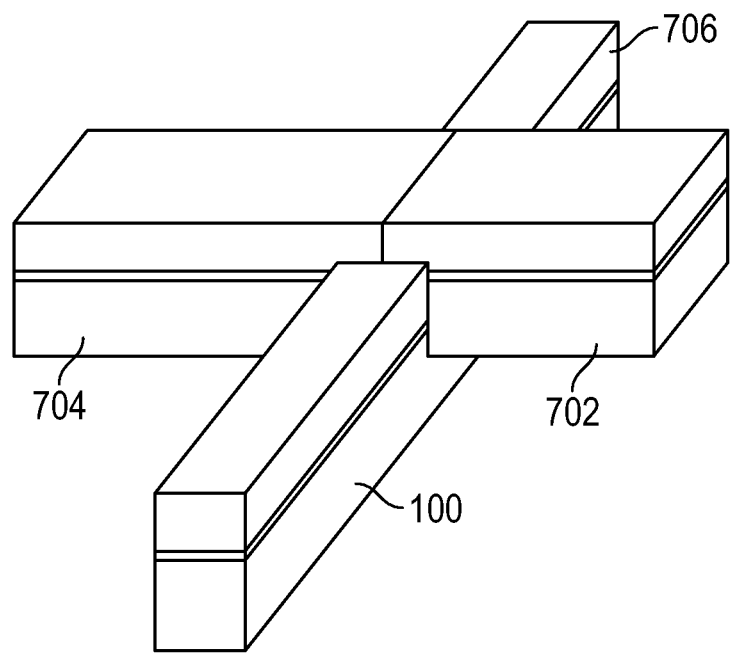
FIG. 7 provides a top view of four of the embodiments illustrated in FIG. 3 when used in conjunction at a four-way intersection.

Referring to FIG. 7, top view of four of the embodiments illustrated in FIG. 3 when used in conjunction at a four-way intersection is provided. When desired, the first body extension length 304 of each of a first pair 100, 702 of four interface transitions 100, 702, 704, and 706 may be one half the first body compressed width 814 of the first body extension length 304 of a second pair 704, 706 of four interface transitions 100, 702, 704, and 706 and each of the second pair 704, 706 of four interface transitions 100, 702, 704, and 706 may be one half the first body compressed width 814 of the first body extension length 304 of a first pair 100, 704 of four interface transitions 100, 702, 704, and 706. Such first body extension lengths 304 provide the junction of each pair of interface transitions positioned in the center of the resulting four-way intersection. As a result, all four interface transitions 100, 702, 704, and 706 are provided in the same orientation. Other first body extension lengths 304 may be selected to position the resulting intersection where desired.

Referring to FIG. 9, a top view of a second arrangement of four of the embodiments illustrated in FIG. 3 when used in conjunction at a four-way intersection is provided. For each of four interface transitions 100, 902, 904, 906 may be provided with varying lengths. For a first interface transition 100, the first body extension length 304 may be twice the first body compressed width 814, such that the first interface transition's extension member 314 extends one first body compressed width 814 beyond a second interface transition 902 when positioned across the first interface transition 100 at a right angle when the second interface transition 902 is positioned in an opposite orientation and to overlap the first interface transition 100.

Likewise, for the second interface transition 902, the first body extension length 304 may be twice the first body compressed width 814, such that the second interface transition's 902 extension member 314 extends one first body compressed width 814 beyond the first interface transition 100 when positioned across the first interface transition 100 at a right angle when the second interface transition 902 is positioned in an opposite orientation and to overlap the first interface transition 100.

The third interface transition 904 and the fourth interface transition 906 may be then be provided with extension members 314 having a first body extension length 304 equal to the first body compressed width 814, resulting in the stepped profile be positioned outside the four-way intersection. Such a construction may provide additional benefits as the location of greatest movement—the intersection—is separate from the location of the resulting overlapping splices.

Thus, the first interface transition 100 of the four interface transitions 100, 902, 904, 906 is perpendicular to the second interface transition 902 of the four interface transitions 100, 902, 904, 906 and the extension member 314 of the first interface transition 100 of the four interface transitions 100, 902, 904, 906 contacts the extension member 314 of the second interface transition 902 of the four interface transitions 100, 902, 904, 906. The first interface transition 100 of the four interface transitions 100, 902, 904, 906 is also parallel to the third interface transition 904 of the four interface transitions 100, 902, 904, 906 and the extension member 314 of the first interface transition 100 of the four interface transitions 100, 902, 904, 906 contacts the extension member 314 of the third interface transition 904 of the four interface transitions 100, 902, 904, 906. The second interface transition 902 of the four interface transitions 100, 902, 904, 906 is parallel to the fourth interface transition 906 of the four interface transitions 100, 902, 904, 906 and the extension member 314 of the second interface transition 902 of the four interface transitions 100, 902, 904, 906 contacts the extension member 314 of the fourth interface transition 906 of the four interface transitions 100, 902, 904, 906.

The extension member 314 may be a shape selected from the group of a rectangular prism, a triangular prism, or an internally-notched partial rectangular prism, particularly when a four-way intersection is desired, such as illustrated in FIG. 7.

Figure 10:
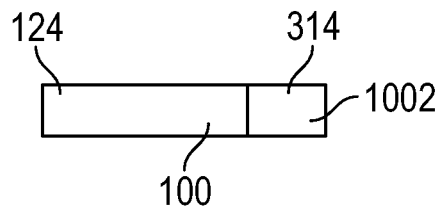
FIG. 10 provides a top view of one embodiment of the extension member when presented as a rectangular prism.

Referring to FIG. 10, a top view of one embodiment of the extension member when presented as a rectangular prism 1002 is provided. Such a shape may be used in conjunction with end splices in a common plane, in right angle splices and in three and four way intersection, such as illustrated in FIGS. 7 and 9.

Figure 11:
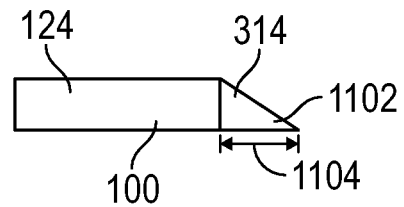
FIG. 11 provides a top view of one embodiment of the extension member when presented as a triangular prism.

As an alternative where two interface transitions 100 are in abutment and the same orientation, such as illustrated in FIG. 7, the extension members 314 or each interface transition 100 may be presented as a triangular prism 1102. Referring to FIG. 11, a top view of one embodiment of the extension member 314 when presented as a triangular prism 1102 is provided. When used in a four-way intersection, the extension members 314 of each pair of interface transitions 100 are positioned in opposition and have an extension length 1104 equal to the uncompressed first body width to accommodate compression against the opposing extension members 314 of the other member of the pair of interface transitions 100. An extension member 314 having a triangular prism 1102 provides a longer surface for connection to the opposing interface transition 100.

Figure 12:
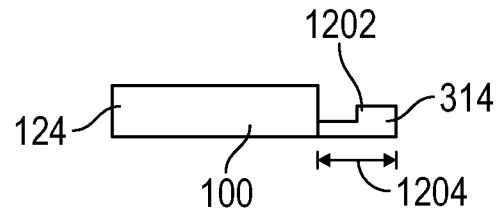
FIG. 12 provides a top view of one embodiment of the extension member when presented as an internally-notched partial rectangular prism.

As an alternative where two interface transitions 100 are in abutment and the same orientation, such as illustrated in FIG. 7, the extension members 314 or each interface transition 100 may be presented as a an internally-notched partial rectangular prism. Referring to FIG. 12, a top view of one embodiment of the extension member 314 when presented as an internally-notched partial rectangular prism 1202 is provided. When used in a four-way intersection, the extension members 314 of each pair of each interface transitions 100 are positioned in opposition and have an extension length 1204 equal to the uncompressed first body width to accommodate compression against the opposing extension members 314 of the other member of the pair of interface transitions 100. An extension member 314 having an internally-notched partial rectangular prism 1202 provides an interlocking longer surface for connection to the adjacent interface transition 100, which further resists separation of the two interface transitions 100.

The foregoing disclosure and description is illustrative and explanatory thereof. Various changes in the details of the illustrated construction may be made within the scope of the appended claims without departing from the spirit of the disclosure. The present disclosure should only be limited by the following claims and their legal equivalents.

We claim:

1. An interface transition, comprising:
a first body,
the first body being laterally elastically resiliently compressible and impregnatable,
the first body having a first body top surface extending from a first body top surface first side edge to a first body top surface second exterior side edge and from a first body top surface first end edge to a first body top surface second end edge,
the first body having a first body uncompressed width from the first body top surface first side edge to the first body top surface second side edge,
the first body having a first body bottom surface opposite the first body top surface extending from a first body bottom surface first edge to a first body second exterior side bottom edge,
the first body having a first body height from the first body top surface second exterior side edge to the first body second exterior side bottom edge,
the first body having a first body first exterior side extending from first body top surface first side edge to the first body bottom surface first edge,
the first body having a first body second exterior side extending from the first body top surface second exterior side edge to the first body second exterior side bottom edge, the first body second exterior side laterally opposite the first body first exterior side;
a second body,
the second body being laterally elastically resiliently compressible,
the second body having a second body bottom surface extending from a second body bottom surface first edge to a second body bottom surface second edge and from a second body bottom surface second end edge to a second body bottom surface first end edge, the second body bottom surface first edge being laterally opposite the second body bottom surface second edge,
the second body having a second body uncompressed width from the second body bottom surface first edge to the second body bottom surface second edge,
the first body uncompressed width and the second body uncompressed width being equal,
the second body having a second body height from a second body top surface second edge to the second body bottom surface first edge,
the second body having a second body first exterior side extending from the second body top surface second edge to the second body bottom surface first edge,
the second body having a second body second exterior side extending from a second body second exterior side top edge to the second body bottom surface second edge, the second body second exterior side laterally opposite the second body first exterior side,
wherein a sum of first body height and second body height is not more than one hundred twenty-five percent of the first body uncompressed width and not less than twenty percent of the first body uncompressed width;
an adhesive layer,
the adhesive layer adhered to the first body top surface from the first body top surface first side edge to the first body top surface second exterior side edge and from the first body top surface first end edge to the first body top surface second end edge, and
the adhesive layer adhered to the second body bottom surface from the second body bottom surface first edge to second body bottom surface second edge and from the second body bottom surface second end edge to the second body bottom surface first end edge,
the adhesive layer impeding air permeability between the first body and the second body, wherein the first body first exterior side is aligned with the second body first exterior side and the first body second exterior side is aligned with the second body second exterior side;
an impregnation impregnated through the first body at one of the first body top surface and the first body bottom surface, the impregnation impeding air permeability through the first body; and wherein the combination of the first body, the second body, the impregnation and the adhesive layer achieve a reduced air leakage rate of no more than 0.04 cfm/ft$^2$ at ±1.57 psf (0.2 L/(s·m$^2$) at ±75 Pa) measured according to ASTM E283-19 through the interface transition where the first body is laterally compressed to a first body compressed width 75% of the first body uncompressed width and the second body is laterally compressed to a second body compressed width equal to the first body compressed width; and wherein the combination of the first body, the second body, the impregnation and the adhesive layer prevent a moisture infiltration for 2 hours at 6.24 psf (−300 Pa) according to ASTM E331-16 into the interface transition where the first body is laterally compressed to the first body compressed width and the second body is laterally compressed to the second body compressed width.

2. The interface transition of claim 1, further comprising:
the first body top surface being flat and the second body bottom surface being flat.

3. The interface transition of claim 2, further comprising:
the second body bottom surface being parallel to the first body top surface;
the first body first exterior side adapted to contact a first substrate separated from a second substrate by a joint first distance;
the second body first exterior side adapted to contact the first substrate;
the first body second exterior side adapted to contact the second substrate; and
the second body second exterior side adapted to contact the second substrate.

4. The interface transition of claim 1, further comprising:
the second body bottom surface being complementary to the first body top surface.

5. The interface transition of claim 1, further comprising:
the second body bottom surface being concave and the first body top surface being convex.

6. The interface transition of claim 1, further comprising:
the second body bottom surface being convex and the first body top surface being concave.

7. The interface transition of claim 1, further comprising:
the second body bottom surface having a ridge and the first body top surface having a valley sized to the ridge.

8. The interface transition of claim 1, further comprising:
the second body being impregnatable; and
the second body impregnated with a second impregnate at one of the second body top surface and the second body bottom surface from the second body top surface to the second body bottom surface.

9. The interface transition of claim 1, wherein the first body is composed of a plurality of layers of one or more foams.

10. The interface transition of claim 1, wherein the second body is composed of a plurality of layers of one or more foams.

11. The interface transition of claim 1,
wherein a second air leakage rate is greater than 0.04 cfm/ft$^2$ at ±1.57 psf (0.2 L/(s·m$^2$) at ±75 Pa) measured through the first body and the second body without the impregnation and adhesive layer according to ASTM E283-19 through the first body through the first body bottom surface to the first body top surface of the first body top surface and through the second body bottom surface to the second body top surface of the second body when the first body top surface is directly adjacent the second body bottom surface and the first body compressed width is 75% of the first body uncompressed width and a second body compressed width is equal to the first body compressed.

12. The interface transition of claim 1,
wherein a second air leakage rate is greater than 0.04 cfm/ft$^2$ at ±1.57 psf (0.2 L/(s·m$^2$) at ±75 Pa) measured through the first body and the second body without the impregnation and adhesive layer according to ASTM E283-19 if the impregnation and the adhesive layer are absent from the interface transition through the interface transition where the first body compressed width is 75% of the first body uncompressed width and the second body compressed width is equal to the first body compressed width.

13. The interface transition of claim 1, further comprising
the first body having a first body length from the first body top surface first end edge to
the first body top surface second end edge,
the first body having a first body first end extending from the first body top surface first end edge to the first body bottom surface,
the second body having a second body length from the second body bottom surface first end edge to the second body bottom surface second end edge,
the second body having a second body first end extending from the second body bottom surface first end edge to the second body top surface, and
the first body first end aligned with the second body first end;
the second body length equal to the first body length;
the adhesive layer having an adhesive layer height;
an extension member including a first body extension, a second body extension and an adhesive layer extension,
the first body extension extending from the first body first end a first body extension length to a first body extension first end,
the first body extension having a first body extension height and a first body extension top surface coplanar with the first body top surface,
the second body extension extending from the second body first end the first body extension length to a second body extension first end,
the second body extension having a second body extension height and a second body extension bottom surface coplanar with the second body bottom surface,
the adhesive layer extension extending from the adhesive layer the first body extension length to the first body extension first end and adhered to the first body extension and the second body extension, the first adhesive layer extension having an adhesive layer extension height equal to the adhesive layer height,
the extension member having an extension member outer surface extending from one of the first body bottom surface and the second body top surface, and
the extension member having an extension member height not more than sixty-five percent (65%) of the sum of the first body extension height and the adhesive layer extension height and the second body extension height.

14. The interface transition of claim 13, wherein the first body extension is an integral extension of the first body, the second body extension is an integral extension of the second body and the adhesive layer extension is an integral extension of the adhesive layer.

15. The interface transition of claim 13, wherein the first body extension is adhered to the first body, the second body extension is adhered to the second body and the adhesive layer extension is adhered to the adhesive layer.

16. The interface transition of claim 14, wherein the first body extension length is equal to the first body compressed width.

17. The interface transition of claim 14, wherein the first body extension length is at least twice the first body compressed width.

18. The interface transition of claim 14, wherein the extension member is a shape selected from the group of a rectangular prism, a triangular prism, and an internally-notched partial rectangular prism.

19. An interface transition system comprising four interface transitions, each interface transition, comprising:
a first body,
the first body being laterally elastically resiliently compressible and impregnatable,
the first body having a first body top surface extending from a first body top surface first side edge to a first body top surface second exterior side edge and from a first body top surface first end edge to a first body top surface second end edge,
the first body having a first body uncompressed width from the first body top surface first side edge to the first body top surface second side edge,
the first body having a first body bottom surface opposite the first body top surface extending from a first body bottom surface first edge to a first body second exterior side bottom edge,
the first body having a first body height from the first body top surface second exterior side edge to the first body second exterior side bottom edge,
the first body having a first body first exterior side extending from first body top surface first side edge to the first body bottom surface first edge,
the first body having a first body second exterior side extending from the first body top surface second exterior side edge to the first body second exterior side bottom edge, the first body second exterior side laterally opposite the first body first exterior side,
a second body,
the second body being laterally elastically resiliently compressible,
the second body having a second body bottom surface extending from a second body bottom surface first edge to a second body bottom surface second edge and from a second body bottom surface second end edge to a second body bottom surface first end edge, the second body bottom surface first edge being laterally opposite the second body bottom surface second edge,
the second body having a second body uncompressed width from the second body bottom surface first edge to the second body bottom surface second edge,
the first body uncompressed width and the second body uncompressed width being equal,
the second body having a second body height from a second body top surface second edge to the second body bottom surface first edge,
the second body having a second body first exterior side extending from the second body top surface second edge to the second body bottom surface first edge,
the second body having a second body second exterior side extending from a second body second exterior side top edge to the second body bottom surface second edge, the second body first exterior side laterally opposite the second body second exterior side,
wherein a sum of first body height and second body height is not more than one hundred twenty-five percent of the first body uncompressed width and not less than twenty percent of the first body uncompressed width;
an adhesive layer,
the adhesive layer adhered to the first body top surface from the first body top surface first side edge to the first body top surface second exterior side edge and from the first body top surface first end edge to the first body top surface second end edge, and
the adhesive layer adhered to the second body bottom surface from the second body bottom surface first edge to second body bottom surface second edge and from the second body bottom surface second end edge to the second body bottom surface first end edge,
the adhesive layer impeding air permeability between the first body and the second body,
wherein the first body first exterior side is aligned with the second body first exterior side and the first body second exterior side is aligned with the second body second exterior side,
an impregnation impregnated through the first body at one of the first body top surface and the first body bottom surface, the impregnation impeding air permeability through the first body;
wherein the combination of the first body, the second body, the impregnation and the adhesive layer achieve a reduced air leakage rate of no more than 0.04 cfm/ft$^2$ at ±1.57 psf (0.2 L/(s·m$^2$) at ±75 Pa) measured according to ASTM E283-19 through the interface transition where the first body is laterally compressed to a first body compressed width 75% of the first body uncompressed width and the second body is laterally compressed to a second body compressed width equal to the first body compressed width;
wherein the impregnation and the adhesive layer prevent a moisture infiltration for 2 hours at 6.24 psf (−300 Pa) according to ASTM E331-16 into the interface transition where the first body is laterally compressed to the first body compressed width and the second body is laterally compressed to the second body compressed width;
the first body having a first body length from the first body top surface first end edge to the first body top surface second end edge;
the first body having a first body first end extending from the first body top surface first end edge to the first body bottom surface;
the second body having a second body length from the second body bottom surface first end edge to the second body bottom surface second end edge;
the second body having a second body first end extending from the second body bottom surface first end edge to the second body top surface;
the first body first end aligned with the second body first end;
the second body length equal to the first body length;
the adhesive layer having an adhesive layer height;
an extension member including a first body extension, a second body extension and an adhesive layer extension,
the first body extension extending from the first body first end a first body extension length to a first body extension first end, wherein the first body extension length is at least twice the first body compressed width, the first body extension having a first body extension height and a first body extension top surface coplanar with the first body top surface, the second body extension extending from the second body first end the first body extension length to a second body extension first end, the second body extension having a second body extension height and a second body extension bottom surface coplanar with the second body bottom surface, the adhesive layer extension extending from the adhesive layer the first body extension length to the first body extension first end and adhered to the first body extension and the second body extension, the first adhesive layer extension having an adhesive layer extension height equal to the adhesive layer height, the extension member having an extension member outer surface extending from one of the first body bottom surface and the second body top surface, and the extension member having an extension member height not more than sixty-five percent (65%) of the sum of the first body extension height and the adhesive layer extension height and the second body extension height;

wherein the first interface transition of the four interface transitions is perpendicular to the second interface transition of the four interface transitions and wherein the extension member of the first interface transition of the four interface transitions contacts the extension member of the second interface transition of the four interface transitions, wherein the first interface transition of the four interface transitions is parallel to the third interface transition of the four interface transitions and wherein the extension member of the first interface transition of the four interface transitions contacts the extension member of the third interface transition of the four interface transitions, and wherein the second interface transition of the four interface transitions is parallel to the fourth interface transition of the four interface transitions and wherein the extension member of the second interface transition of the four interface transitions contacts the extension member of the fourth interface transition of the four interface transitions.

20. An interface transition, comprising:

a first body, the first body being laterally elastically resiliently compressible and impregnatable, the first body having a first body top surface extending from a first body top surface first side edge to a first body top surface second exterior side edge and from a first body top surface first end edge to a first body top surface second end edge, the first body having a first body uncompressed width from the first body top surface first side edge to the first body top surface second side edge, the first body having a first body bottom surface opposite the first body top surface extending from a first body bottom surface first edge to a first body second exterior side bottom edge, the first body having a first body height from the first body top surface second exterior side edge to the first body second exterior side bottom edge, the first body having a first body first exterior side extending from the first body top surface first side edge to the first body bottom surface first edge, the first body having a first body second exterior side extending from the first body top surface second exterior side edge to the first body second exterior side bottom edge laterally opposite the first body first exterior side, a second body, the second body being laterally elastically resiliently compressible and impregnatable, the second body having a second body bottom surface extending from a second body bottom surface first edge to a second body bottom surface second edge and from a second body bottom surface second end edge to a second body bottom surface first end edge, the second body bottom surface first edge being laterally opposite the second body bottom surface second edge, the second body having a second body uncompressed width from the second body bottom surface first edge to the second body bottom surface second edge, the first body uncompressed width and the second body uncompressed width being equal, the second body having a second body height from a second body top surface second edge to the second body bottom surface first edge, the second body having a second body first exterior side extending from the second body top surface second edge to the second body bottom surface first edge, the second body having a second body second exterior side extending from a second body second exterior side top edge to the second body bottom surface second edge, wherein a sum of first body height and second body height is not more than one hundred twenty-five percent of the first body uncompressed width and not less than twenty percent of the first body uncompressed width;

an adhesive layer, the adhesive layer adhered to the first body top surface from the first body top surface first side edge to the first body top surface second exterior side edge and from the first body top surface first end edge to the first body top surface second end edge, and the adhesive layer adhered to the second body bottom surface from the second body bottom surface first edge to second body bottom surface second edge and from the second body bottom surface second end edge to the second body bottom surface first end edge, the adhesive layer impeding air permeability between the first body and the second body, wherein the first body first exterior side is aligned with the second body first exterior side and the first body second exterior side is aligned with the second body second exterior side, an impregnation impregnated through the first body at one of the first body top surface and the first body bottom surface, the impregnation impeding air permeability through the first body;

a second impregnation impregnated through the second body at one of the second body top surface and the second body bottom surface, the second impregnation impeding air permeability through the second body; and wherein the combination of the first body, the second body, the impregnation, the second impregnation, and the adhesive layer achieve a reduced air leakage rate of no more than 0.04 cfm/ft$^2$ at ±1.57 psf (0.2 L/(s·m$^2$) at ±75 Pa) measured according to ASTM E283-19 through the interface transition where the first body is laterally compressed to a first body compressed width 75% of the first body uncompressed width and the second body is laterally compressed to a second body compressed width equal to the first body compressed width; and wherein the impregnation, the second impregnation, and the adhesive layer prevent a moisture infiltration for 2 hours at 6.24 psf (−300 Pa) according to ASTM E331-16 into the interface transition where the first body is laterally compressed to the first body compressed width and the second body is laterally compressed to the second body compressed width.

21. An interface transition, comprising:

a first body,
- the first body being laterally elastically resiliently compressible and having a first body height and a first body uncompressed width,
- the first body formed of a porous and impregnatable first foam,
- the first body having a first body uncompressed width from the first body top surface first side edge to the first body top surface second side edge,
- the first body having a first body bottom surface opposite the first body top surface extending from a first body bottom surface first edge to a first body second exterior side bottom edge,
- the first body having a first body height from the first body top surface second exterior side edge to the first body second exterior side bottom edge,
- the first body having a first body first exterior side extending from first body top surface first side edge to the first body bottom surface first edge,
- the first body having a first body second exterior side extending from the first body top surface second exterior side edge to the first body second exterior side bottom edge laterally opposite the first body first exterior side, a second body,
- the second body being laterally elastically resiliently compressible and having a second body height,
- the second body formed of a porous and impregnatable second foam,
- wherein a sum of the first body height and the second body height is not more than one hundred twenty-five percent of the first body uncompressed width and not less than twenty percent of the first body uncompressed width;

an adhesive layer,
- the adhesive layer adhered to the first body and the second body,
- the adhesive layer impeding air permeability between the first body and the second body, an impregnation impregnated through the first body, the impregnation impeding air permeability through the first body; and the impregnation impregnated through the second body, the impregnation impeding air permeability through the second body; and wherein the combination of the first body, the second body, the impregnation and the adhesive layer achieve a reduced air leakage rate of no more than 0.04 cfm/ft² at ±1.57 psf (0.2 L/(s·m²) at ±75 Pa) measured according to ASTM E283-19 through the interface transition where the first body is laterally compressed to a first body compressed width 75% of the first body uncompressed width and the second body is laterally compressed to a second body compressed width equal to the first body compressed width; and wherein the impregnation and the adhesive layer prevent a moisture infiltration for 2 hours at 6.24 psf (−300 Pa) according to ASTM E331-16 into the interface transition where the first body is laterally compressed to the first body compressed width and the second body is laterally compressed to the second body compressed width.

* * * * *